(12) United States Patent
Song et al.

(10) Patent No.: US 8,767,162 B2
(45) Date of Patent: Jul. 1, 2014

(54) LIQUID CRYSTAL DISPLAY PANEL

(75) Inventors: Hyo-Sik Song, Seoul (KR); Dae-Kyu Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 97 days.

(21) Appl. No.: 13/338,032

(22) Filed: Dec. 27, 2011

(65) Prior Publication Data

US 2012/0218499 A1 Aug. 30, 2012

(30) Foreign Application Priority Data

Feb. 28, 2011 (KR) .................... 10-2011-0018109

(51) Int. Cl.
*G02F 1/1339* (2006.01)

(52) U.S. Cl.
USPC ............................. 349/157; 349/154; 349/156

(58) Field of Classification Search
CPC ............................................. G02F 2001/13396
USPC .................................. 349/154, 155, 156, 157
See application file for complete search history.

(56) References Cited

U.S. PATENT DOCUMENTS

| | | | | |
|---|---|---|---|---|
| 5,798,813 A | * | 8/1998 | Ohashi et al. ................. | 349/154 |
| 5,838,414 A | * | 11/1998 | Lee .............................. | 349/157 |
| 5,858,482 A | * | 1/1999 | Ishiwata et al. ............... | 349/157 |
| 6,304,308 B1 | * | 10/2001 | Saito et al. .................... | 349/155 |
| 7,652,743 B2 | * | 1/2010 | Watanabe ...................... | 349/156 |

FOREIGN PATENT DOCUMENTS

| | | |
|---|---|---|
| CN | 1153960 A | 7/1997 |
| CN | 1223384 A | 7/1999 |
| CN | 1441304 A | 9/2003 |
| CN | 101446712 A | 6/2009 |
| GB | 1 376 926 | 12/1974 |
| TW | 200708821 | 3/2007 |

* cited by examiner

*Primary Examiner* — Edward Glick
*Assistant Examiner* — Mark Teets
(74) *Attorney, Agent, or Firm* — Birch, Stewart, Kolasch & Birch, LLP

(57) ABSTRACT

The present invention relates to a liquid crystal display panel, which can prevent a Mura from forming at the time of physical impact or vibration for improving a display quality. The liquid crystal display panel can include an upper substrate having a plurality of column lines formed thereon, a lower substrate having a plurality of row lines formed thereon perpendicular to the plurality of column lines, a pixel region formed at each crossed region of the plurality of column lines and the plurality of row lines, and column spacers each formed between the upper substrate and the lower substrate for maintaining a cell gap between the upper substrate and the lower substrate, wherein the column spacers formed at a first region of a display region adjacent to a liquid crystal injection have dot shapes.

13 Claims, 11 Drawing Sheets

LIQUID CRYSTAL DISPLAY PANEL

CROSS REFERENCE TO RELATED APPLICATION

This application claims the benefit of the Korean Patent Application No. 10-2011-0018109, filed on Feb. 28, 2011, which is hereby incorporated by reference as if fully set forth herein.

BACKGROUND OF THE DISCLOSURE

1. Field of the Disclosure

The present invention relates to liquid crystal display panels, and more particularly to a liquid crystal display panel which can prevent a Mura from forming at the time of physical impact or vibration for improving a display quality.

2. Discussion of the Related Art

Recently, flat display devices are spot lighted as a next generation display devices, which can overcome drawbacks of cathode ray tubes CRT to enable to fabricate the display device lighter and smaller than before. As an example of typical flat display devices, there are liquid crystal display devices, organic light display devices, and so on.

The liquid crystal display device controls a light transmissivity of liquid crystals having dielectric anisotropy by using an electric field for displaying a picture. The liquid crystal display device is provided with a liquid crystal display panel having an upper substrate and a lower substrate bonded together opposite to each other, column spacers for maintaining a fixed cell gap between the two substrates, and liquid crystals filled in the cell gap. In the liquid crystal display panels, there are a passive type liquid crystal display panel having column lines formed on the upper substrate and row lines formed on the lower substrate perpendicular to each other, and an active type liquid crystal display panel having a thin film transistor array formed on the upper substrate and a color filter array formed on the lower substrate.

In the meantime, the column spacers in the liquid crystal display panel have dot shapes or ball shapes formed at corners of each of the pixel regions. And, in order to improve a cell gap maintaining capability, though a plurality of dot column spacers or ball spacers are formed, upon application of an external pressure, a Mura phenomenon takes place as shown in FIG. 1.

SUMMARY OF THE DISCLOSURE

Accordingly, the present invention is directed to a liquid crystal display panel.

An object of the present invention is to provide a liquid crystal display panel which can prevent a Mura from forming at the time of physical impact or vibration for improving a display quality.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display panel includes an upper substrate having a plurality of column lines formed thereon, a lower substrate having a plurality of row lines formed thereon perpendicular to the plurality of column lines, a pixel region formed at each crossed region of the plurality of column lines and the plurality of row lines, and column spacers each formed between the upper substrate and the lower substrate for maintaining a cell gap between the upper substrate and the lower substrate, wherein the column spacers formed at a first region of a display region adjacent to a liquid crystal injection have dot shapes and the column spacers formed at a second region which is rest of the display region excluding the first region have dam shapes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts. It will be paid attention to that detailed description of known arts is omitted if it is determined that the description can lead to misunderstanding of the present invention.

Preferred embodiments of the present invention will be described with reference to FIGS. 2 to 11B.

Figure 1:
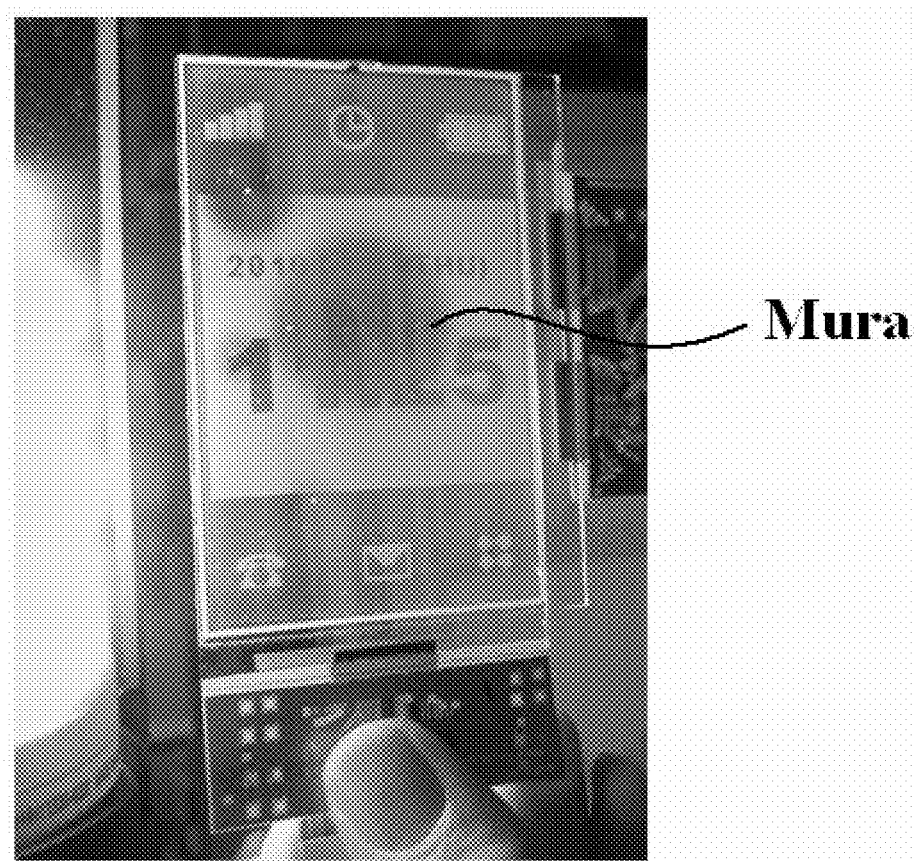
FIG. 1 illustrates a photograph of a screen having a Mura formed in a case dot shaped column spacers are formed.
Figure 2:
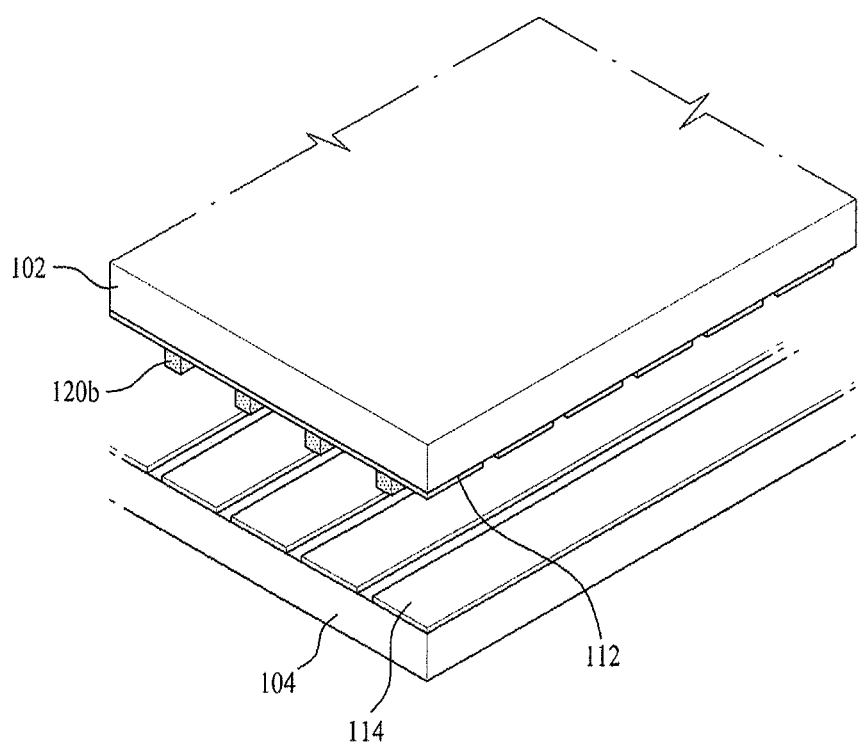
FIG. 2 illustrates a perspective view of a liquid crystal display panel in accordance with a first preferred embodiment of the present invention.
Figure 3A:
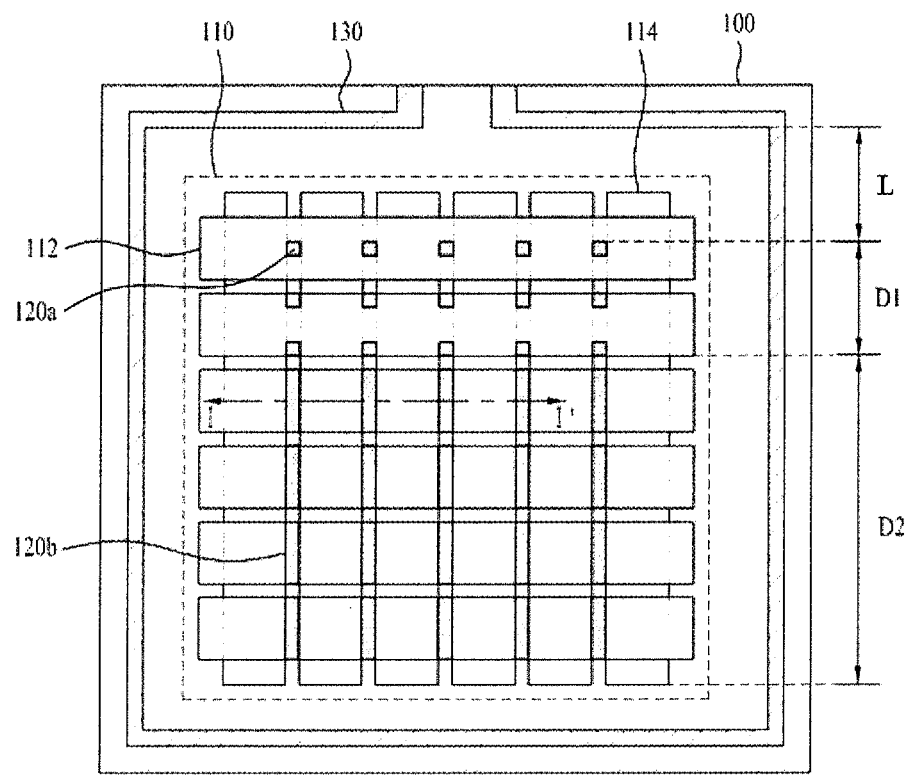
FIG. 3A illustrates a plan view of the liquid crystal display panel in FIG. 2.
Figure 3B:
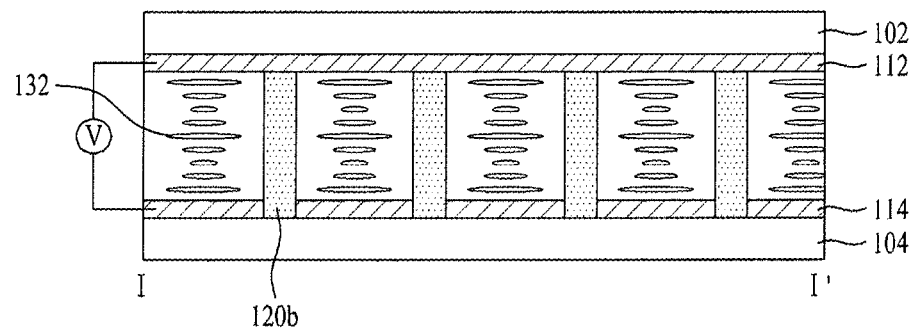
FIG. 3B illustrates a section across a line I-I' in the liquid crystal display panel in FIG. 3A.

FIG. 2 illustrates a perspective view of a liquid crystal display panel in accordance with a first preferred embodiment of the present invention, FIG. 3A illustrates a plan view of the liquid crystal display panel in FIG. 2, and FIG. 3B illustrates a section across a line I-I' in the liquid crystal display panel in FIG. 3A.

Referring to FIGS. 2 to 3B, the liquid crystal display panel 100 includes an upper substrate 102 and a lower substrate 104 bonded together by a seal line 130 with liquid crystals 132 disposed therebetween, and column spacers 120a and 120b formed between the upper and lower substrates 102 and 104. The liquid crystal display panel 100 is controlled by column lines 114 and row lines 112 arranged perpendicular to each other. The perpendicular column lines 114 and row lines 112 define pixel regions each at every crossed region.

The upper substrate 102 has a plurality of the row lines 112 formed of transparent conductive layer in a first direction. The transparent conductive layer can be formed of tin oxide TO, indium tin oxide ITO, indium zinc oxide IZO, and indium tin zinc oxide ITZO.

The lower substrate 104 has a plurality of the column lines 114 formed of transparent conductive layer in a second direction perpendicular to the first direction. The transparent conductive layer can be formed of tin oxide TO, indium tin oxide ITO, indium zinc oxide IZO, and indium tin zinc oxide ITZO.

Figure 4:
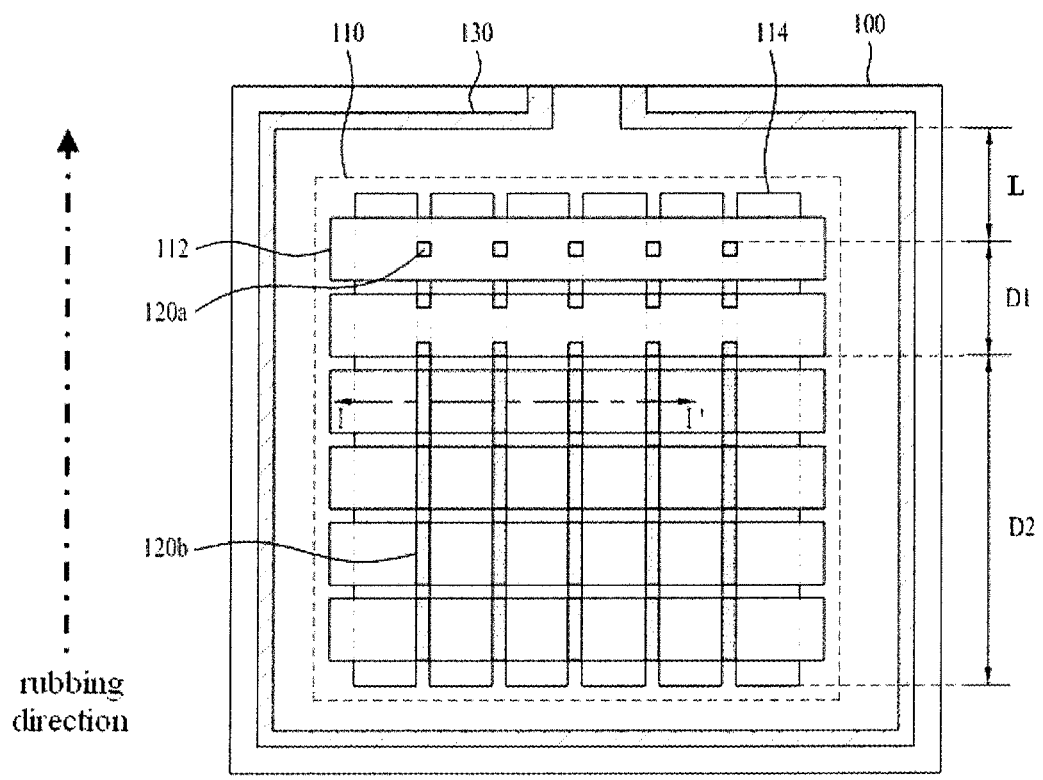
FIG. 4 illustrates a plan view to explain a rubbing direction of an alignment layer of the present invention.

The liquid crystals 132 are driven by the row lines 112 of the upper substrate 120 and the column lines 114 of the lower substrate 104. In this instance, the liquid crystals 132 can be cholesteric liquid crystals. An arrangement of the cholesteric liquid crystals 132 varies with an electric field between the row lines 112 and the column lines 114 without an arrangement layer. When no voltage is applied to the liquid crystals 132, the liquid crystals 132 in a planar structure produce a color as a light having a wavelength the same as a pitch of the liquid crystals 132 in the planar structure is reflected at the liquid crystals 132. If the voltage increases, the liquid crystals 132 in a focal cone structure scatter the light passing through a layer of the liquid crystals 132. If the voltage is pulled up further, the liquid crystals 132 turn from the focal cone structure to a vertical structure to transmit the light. That is, the cholesteric liquid crystals 132 scatter the light in the focal cone phase, and reflect the light in the planar phase. As above, the present invention can align the cholesteric liquid crystals without the arrangement layer. Thus, the present invention can omit the rubbing process. Although the liquid crystal display panel 100 of the present invention is applied to column spacers in dam type, a formation of non-uniform regions of the alignment layer can be prevented. Also, the liquid crystals 132 of the present invention can be TN or IPS liquid crystals. In TN or IPS liquid crystal display panel, the column spacers in dam type are arranged in parallel to the rubbing direction of the alignment layer, as shown in FIG. 4. Thus, the TN or IPS liquid crystal display panel of present invention can prevent misalign of the liquid crystal caused by non-uniform regions of the alignment layer.

The column spacers 120a and 120b form a cell gap between the upper and lower substrates 102 and 104, and are formed between the pixel regions as shown in FIGS. 3A and 3B, respectively. That is, a distance between adjacent column spacers is the same with a length or width of the pixel region. As shown in FIGS. 3A and 3B, the length of the column spacers 120b in dam shapes is longer than the length of the column spacers 120a in dot shapes. The distance between adjacent column spacers 120a and 120b can be the same with a length of the pixel region, or though not shown, longer or shorter than the length of the pixel region. Thus, by forming the column spacers 120b between the pixel regions in the dam shapes respectively, the column spacers 120b enhance the cell gap maintaining capability. In other words, different from the related art dot column spacers, by forming the column spacers 120b between pixel regions in the dam shapes respectively, the column spacers 120b enhance the cell gap maintaining capability. Moreover, though the liquid crystals 132 have a characteristic in which, when the liquid crystals 132 are undergoing a phase change, since not only the liquid crystals having a pressure applied thereto directly change, but also the liquid crystals having the pressure applied thereto influence surrounding liquid crystals, to change together, the column spacers 120b of the dam shapes block the liquid crystals 132 having the pressure applied thereto from influencing the surrounding liquid crystals to a certain extent, to prevent the phase of the liquid crystals 132 having the pressure applied thereto from spreading or diffusing to the surrounding liquid crystals.

That is, the cholesteric liquid crystals 132 has a characteristic in which the cholesteric liquid crystals 132 turn from the focal cone phase to the planar phase which is a stable state upon application of a pressure thereto. Though the Mura appears following the change of the phase which distorts an image, the column spacers 120a and 120b of the present invention formed on both sides of the pixel region enhance resistance force against the external pressure, thereby preventing the Mura from taking place.

Moreover, the column spacers 120a formed at first region D1 of the display region 110 adjacent to a liquid crystal injection in a seal line, and the column spacers 120b at a second region D2 which is rest of the display region 110 excluding the first region D1 on one side of the sealant 130 have sizes and distributions different from each other. As shown in FIGS. 3A and 3B, the column spacers 120a at the first region D1 are positioned partially, and smaller than the column spacers 120b at the second region D2. That is, the column spacers 120a at the first region D1 can have dot shapes each to have a length shorter than a length of the pixel region, for uniform injection or dropping of the liquid crystals 132 in injection or dropping of the liquid crystals 132. It is preferable that a distance L from the liquid crystal injection to the first region D1 of the display region 110 is in a range of 1 mm~7 mm, preferably 3 mm~5 mm. And, a number of the column spacers in the first region D1 are formed to be gradually more as it goes to the second region D2. Also, the width of the column spacers in the first region D1 is formed to be gradually wider as it goes to the second region D2.

Thus, the continuous dam shape formation of the column spacers 120b at the display region 110 enhances resistance against the external pressure, and the partial formation of the column spacers 120a in the vicinity D1 and D2 of liquid crystal injection hole in the display region 110 can make liquid crystal injection easy.

Figure 5A:
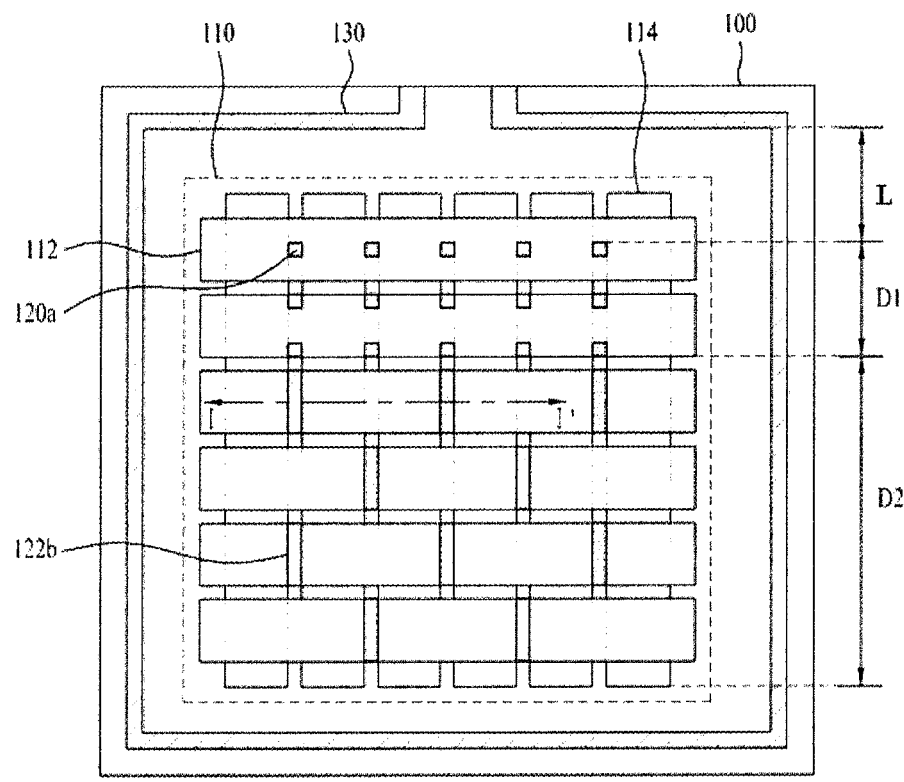
FIGS. 5A and 6A illustrate plan views of liquid crystal display panels in accordance with a second preferred embodiment of the present invention respectively.
Figure 5B:
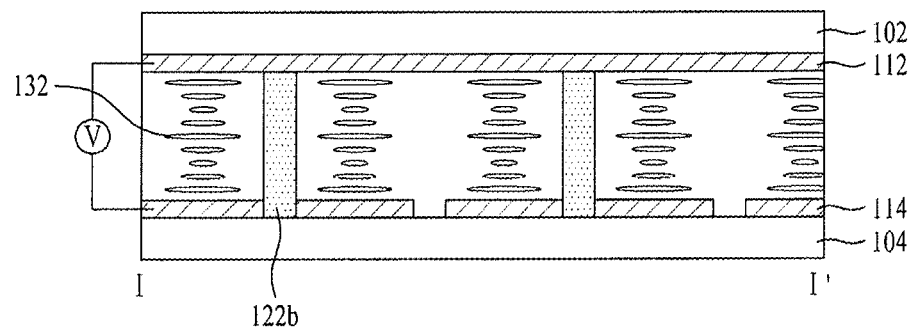
FIG. 5B illustrates a section across a line I-I' in the liquid crystal display panel in FIG. 5A.
Figure 6A:
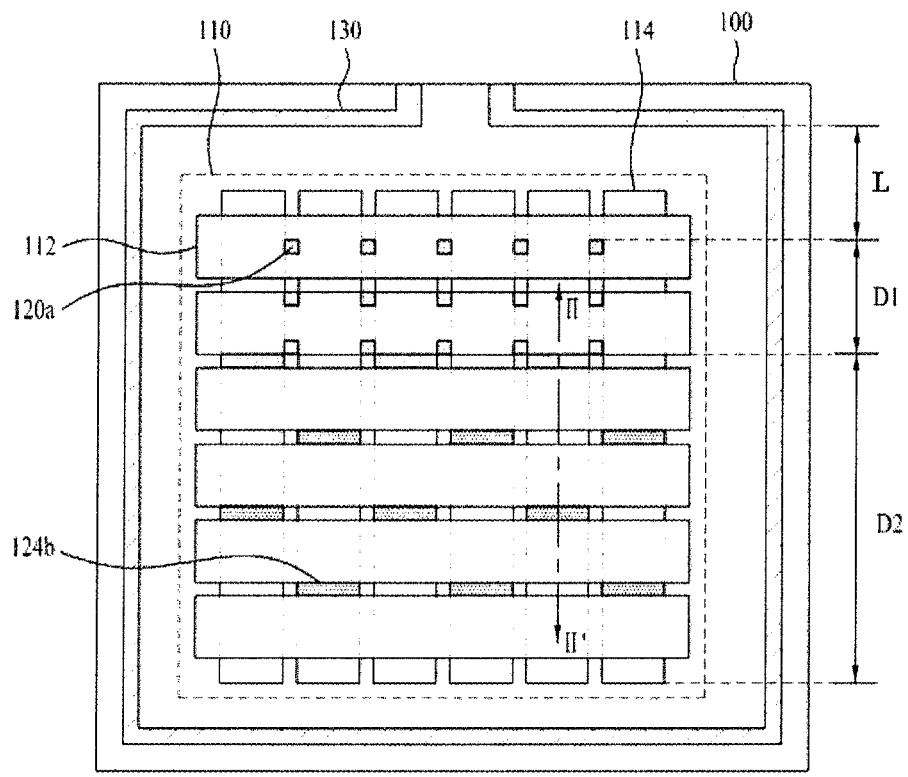
Figure 6B:
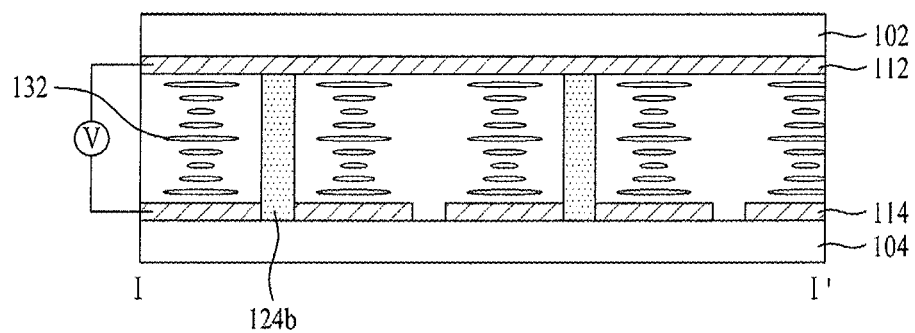
FIG. 6B illustrates a section across a line II-II' in the liquid crystal display panel in FIG. 6A.

FIGS. 5A and 6A illustrate plan views of liquid crystal display panels in accordance with a second preferred embodiment of the present invention respectively, FIG. 5B illustrates a section across a line I-I' in the liquid crystal display panel in FIG. 5A, and FIG. 6B illustrates a section across a line II-II' in the liquid crystal display panel in FIG. 6A.

Referring to FIGS. 5A, 5B, 6A and 6B, the liquid crystal display panel 100 includes an upper substrate 102 and a lower substrate 104 bonded together by a seal line 130 with liquid crystals 132 disposed therebetween, and column spacers 120a and 122b or 124b formed between the upper and lower substrates 102 and 104. Since the liquid crystal display panel 100 is identical to the foregoing liquid crystal display panel excluding the column spacers, description of elements will be omitted excluding the column spacers.

The column spacers 120a, 122b, and 124b fix a cell gap between the upper and lower substrates 102 and 104, and, as shown in FIGS. 5A, 5B, 6A and 6B, the column spacers 122b, and 124b can be formed in dam shapes in zigzag at the pixel regions. Each of the column spacers is formed in the dam shape on a side of every odd numbered pixel region on the odd numbered column lines, and in the dam shape on a side of every even numbered pixel region on the even numbered column lines, to form the column spacers in the dam shapes at the pixel regions on the column lines and at the pixel regions on the row lines, alternately.

In detail, referring to FIGS. 5A, and 5B, the column spacer 122b can be formed in the dam shape on right side or left side of each of the odd numbered pixel regions on the odd numbered column lines, and in the dam shape on right side or left side of each of even numbered pixel regions on the even numbered column lines. The column spacers 122b in the second region D2 of the display region 110 are formed in a zigzag along a direction parallel to the column lines 114.

And, referring to FIGS. 6A, and 6B, the column spacer 124b can formed in the dam shape on upper side or lower side of each of the odd numbered pixel regions on the odd numbered row lines, and in the dam shape on upper side or lower side of each of even numbered pixel regions on the even numbered row lines. The column spacers 124b in the second region D2 of the display region 110 are formed in a zigzag along a direction parallel to the row lines 112.

Referring to FIGS. 5A, 5B, 6A and 6B, the column spacers can be formed to have a length the same with both side length of the pixel region, or, though not shown, to have a length shorter than both side length of the pixel region. Thus, the formation of the column spacers 122b or 124b in the dam shapes on both sides of the pixel region enhances the cell gap maintaining capability, thereby preventing the Mura from taking place by enhancing resistance force against the external pressure.

Moreover, the column spacer 120a formed at the first region D1 of the display region 110, and the column spacers 122b and 124b formed at a second region D2 which is rest of the display region 110 excluding the first region D1 on one side of the sealant 130 have sizes and distributions different from each other. As shown in FIGS. 5A, 5B, 6A and 6B, the column spacers 120a at the first region D1 and D2 are positioned partially, and smaller than the column spacers 122b and 124b at the second region D2. That is, the column spacers 120a at the first region D1 can have dot shapes each to have a length shorter than a length of both sides of the pixel region, for uniform injection or dropping of the liquid crystals 132 in injection or dropping of the liquid crystals 132.

In the meantime, referring to FIGS. 5A and 5B, it is preferable that a distance L from the liquid crystal injection to the first region D1 of the display region 110 is in a range of 1 mm~7 mm, preferably 3 mm~5 mm, if the spacer is formed on the right side or left side, alternately.

And, referring to FIGS. 6A and 6B, it is preferable that a distance L from the liquid crystal injection to the first region D1 of the display region 110 is in a range of 1 mm~3 mm, preferably 1.5 mm if the spacer is formed on the upper side or lower side, alternately.

Figure 7A:
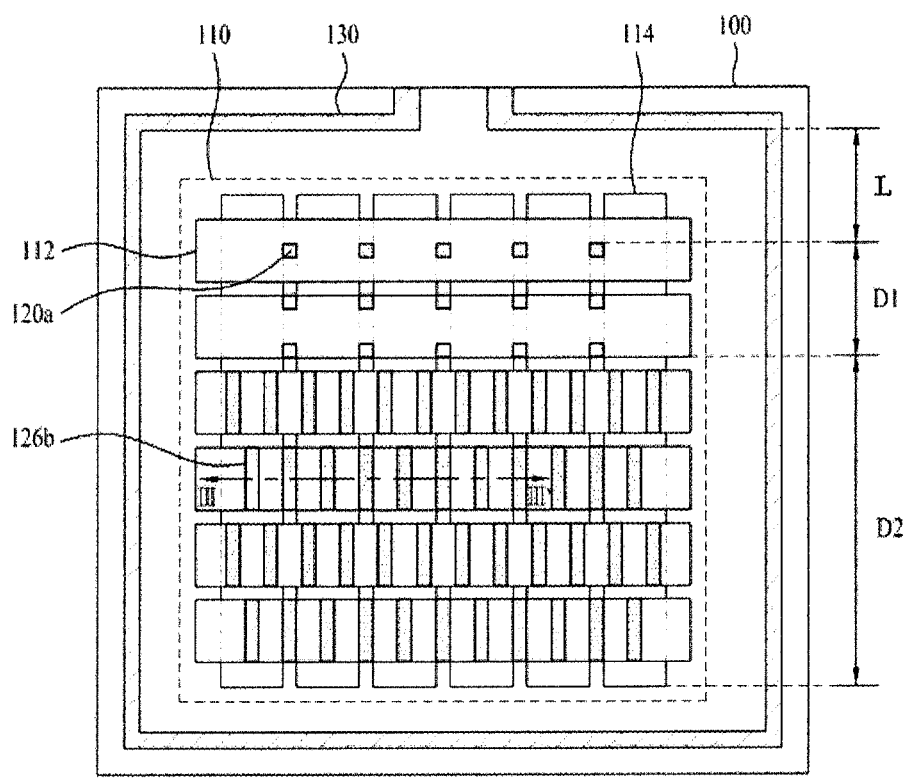
FIG. 7A illustrates a plan view of a liquid crystal display panel in accordance with a third preferred embodiment of the present invention.
Figure 7B:
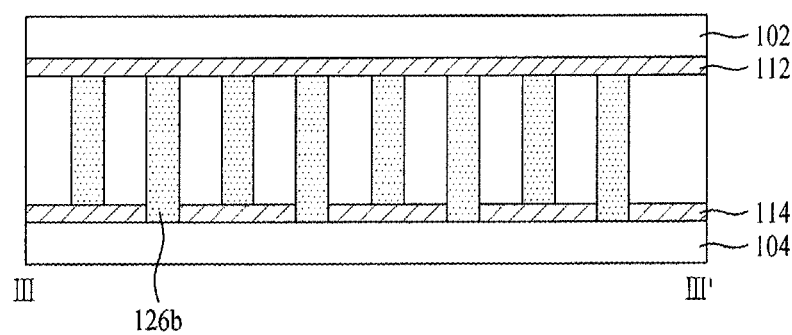
FIG. 7B illustrates a section across a line in the liquid crystal display panel in FIG. 7A.

FIG. 7A illustrates a plan view of a liquid crystal display panel in accordance with a third preferred embodiment of the present invention, and FIG. 7B illustrates a section across a line III-III' in the liquid crystal display panel in FIG. 7A.

Referring to FIGS. 7A and 7B, the liquid crystal display panel 100 includes an upper substrate 102 and a lower substrate 104 bonded together by a seal line 130 with liquid crystals 132 disposed therebetween, and column spacers 120a and 126b formed between the upper and lower substrates 102 and 104. Since the liquid crystal display panel 100 is identical to the foregoing liquid crystal display panel excluding the column spacers, description of elements will be omitted excluding the column spacers.

The column spacers 120a and 126b form a cell gap between the upper and lower substrates 102 and 104, a distance between adjacent column spacers is shorter than a length of one pixel region, and each of the column spacers 126b is formed in a dam shape as shown in FIGS. 7A and 7B. The column spacers 126b on the odd numbered column lines and the column spacers 126b on the even numbered column lines are formed in zigzag. As shown in FIGS. 7A and 7B, each of the column spacers 120a and 126b can be formed at a length the same with a length of both sides of the pixel region, or though not shown, longer or shorter than the both sides of the pixel region. Thus, by forming the column spacers 126b on both sides of each of the pixel regions in the dam shapes, the column spacers 126b enhance the cell gap maintaining capability. In other words, different from the related art dot column spacers, by forming the column spacers 126b on both sides of the pixel region in the dam shapes, the column spacers 126b enhance the resistance force against the external pressure.

Moreover, the column spacers 120a formed at the first region D1 of the display region 110, and the column spacers 126b formed at the second region D2 which is rest of the display region 110 excluding the first region D1 on one side of the sealant 130 have sizes and distributions different from each other. As shown in FIGS. 7A and 7B, the column spacers 120a at the first region D1 is positioned partially, and smaller than the column spacers 120b at the second region D2.

That is, the column spacers 120a at the first region D1 can have dot shapes each to have a length shorter than a length of both sides of the pixel region, for uniform injection or dropping of the liquid crystals 132 in injection or dropping of the liquid crystals 132. It is preferable that a distance L from the liquid crystal injection to the first region D1 of the display region 110 is in a range of 1 mm~7 mm, preferably 3 mm~5 mm. And, a number of the column spacers in the first region D1 are formed to be gradually more as it goes to the second region D2. Also, the width of the column spacers in the first region D1 is formed to be gradually wider as it goes to the second region D2.

In the meantime, spread of the liquid crystals phase turn will be compared in association with a table 1 below showing a case in which the column spacers of first to third embodiments of the present invention are applied thereto, and a case in which the related art dot column spacers are applied thereto.

Table 1 shows a result of experiment of a case in which a liquid crystal phase turn to the focal cone phase or a planar phase following a cell gap change caused by the external pressure. A type 1 shows turn of the liquid crystal phase in a case in which the column spacers in accordance with the first preferred embodiment of the present invention are formed, a type 2 shows turn of the liquid crystal phase in a case in which the column spacers in accordance with the second preferred embodiment of the present invention in FIG. 5A are formed, a type 3 shows turn of the liquid crystal phase in a case in which the column spacers in accordance with the second preferred embodiment of the present invention in FIG. 6A are formed, a type 4 shows turn of the liquid crystal phase in a case in which the column spacers in accordance with the third preferred embodiment of the present invention in FIG. 7A are formed, a type 5 shows turn of the liquid crystal phase in a case in which the related art dot column spacers are formed at corner portions of the pixel region, and a type 6 shows turn of the liquid crystal phase in a case in which a plurality of the related art dot column spacers are formed at the pixel region.

| Type | Turn of liquid crystal phase by an external pressure |
| --- | --- |
| Type 1 | 80 gf |
| Type 2 | 50 gf |
| Type 3 | 60 gf |
| Type 4 | 300 gf |
| Type 5 | 10 gf |
| Type 6 | 10 gf |

Though it can be known that the column spacers in accordance with any one of the first to third embodiments of the present invention show turn of the liquid crystal phase when the external pressure of 50~300 gf is applied to the display region, it can be known that the dot column spacers show turn of the liquid crystal phase when the external pressure of 10 gf is applied to the display region. Thus, it can be known that the dam shaped column spacers of the present invention show turn of the liquid crystal phase when the external pressure of 5 to 30 times of the related art dot column spacers is applied to the display region.

FIGS. 8A to 11B illustrate plan views and sections for describing a method for fabricating a liquid crystal display panel in accordance with a preferred embodiment of the present invention.

Figure 8A:
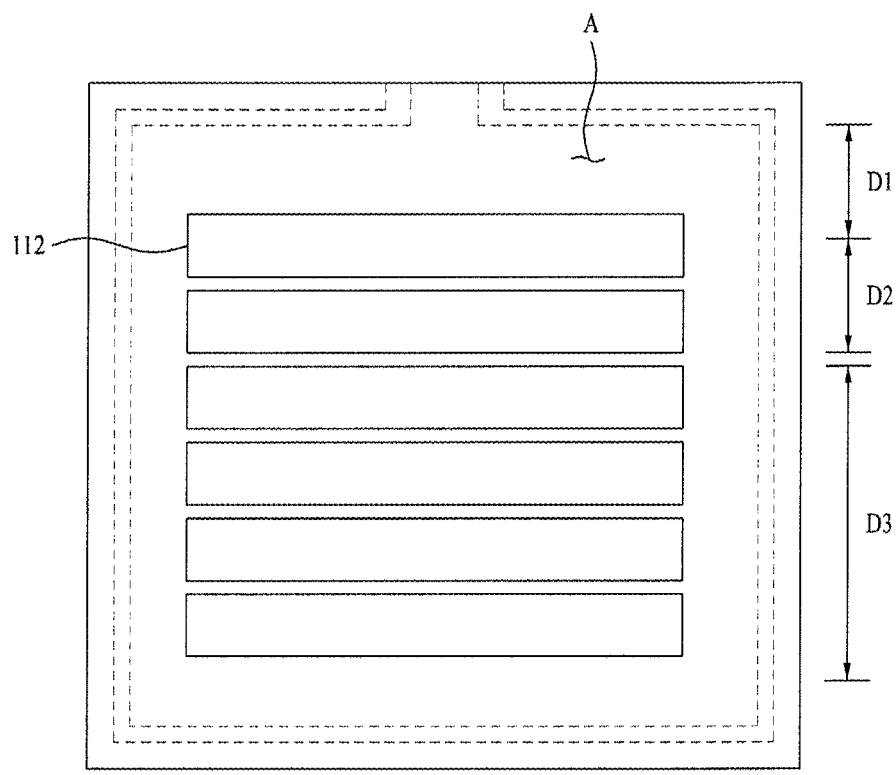
FIGS. 8A to 11B illustrate plan views and sections for describing a method for fabricating a liquid crystal display panel in accordance with a preferred embodiment of the present invention.
Figure 8B:
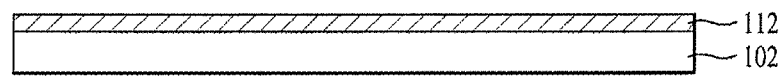

FIGS. 8A and 8B illustrate a plan view and a section for describing a step for fabricating row lines on an upper substrate of a method for fabricating a liquid crystal display panel in accordance with a preferred embodiment of the present invention, respectively.

Referring to FIGS. 8A and 8B, the row lines 112 are formed on an upper substrate 102 in a first direction.

In detail, a transparent conductive layer is formed on the upper substrate 102 by deposition such as sputtering. The transparent conductive layer is formed of tin oxide TO, indium tin oxide ITO, indium zinc oxide IZO, and indium tin zinc oxide ITZO. The transparent conductive layer is subjected to patterning by photolithography and etching to form the row lines 112 in the first direction.

Figure 9A:
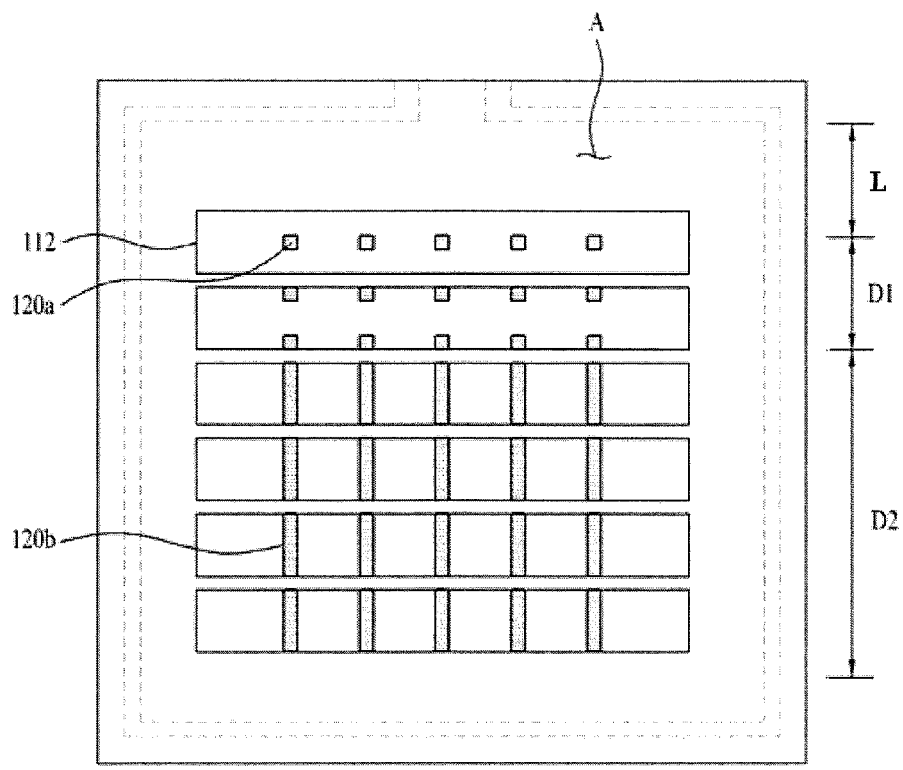
Figure 9B:
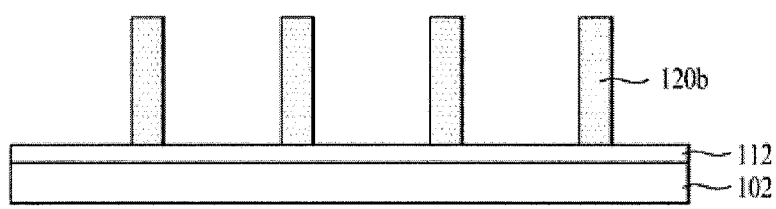

FIGS. 9A and 9B illustrate a plan view and a section for describing a step for fabricating column spacers of a method for fabricating a liquid crystal display panel in accordance with a preferred embodiment of the present invention, respectively.

Referring to FIGS. 9A and 9B, dam shapes of column spacers 120b are formed on both sides of each of the pixel regions, wherein the column spacers 120a at a region in the vicinity of a liquid crystal injection hole are formed, partially.

In detail, an organic material layer is formed on the upper substrate 102, and subjected to patterning by photolithography and etching to form the column spacers 120b of dam shapes on both sides of a region where the pixel region is to be formed, wherein the column spacers 120a at a region in the vicinity of a liquid crystal injection hole are formed, partially. Or, as shown in FIGS. 5A and 6A, the column spacers 122b and 124b can be formed in a zigzag form at the pixel regions in the dam shapes, and as shown in FIG. 7A, adjacent column spacers 126b have a distance shorter than one pixel region, and the column spacers can be formed at the distance in dam shapes. Thus, though the column spacers 120a, 120b, 122b, 124, and 126b can be formed in accordance with one of the first to third embodiments of the present invention, description will proceed taking the first embodiment as an example. And, though the description is made taking an example in which the column spacers 120a, 120b, 122b, 124b, and 126b are formed on the upper substrate 102, the column spacers 120a, 120b, 122b, 124b, and 126b can also be formed on the lower substrate 104.

Figure 10A:
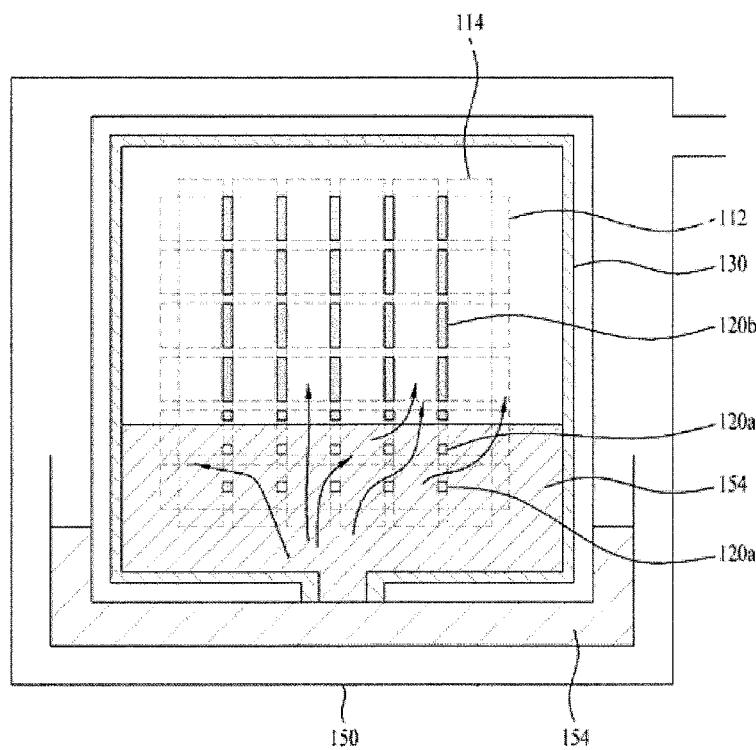
Figure 10B:
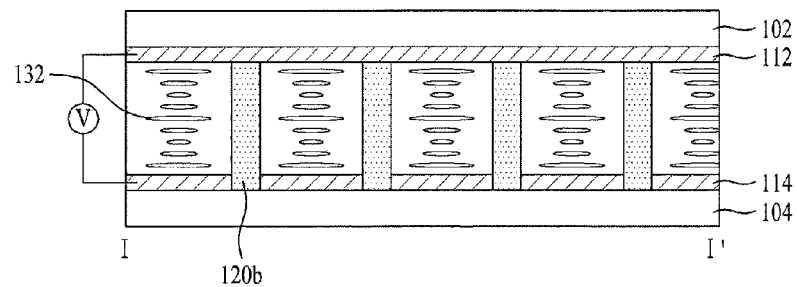

FIGS. 10A and 10B illustrate a plan view and a section for describing a step for injecting liquid crystals of a method for fabricating a liquid crystal display panel in accordance with a preferred embodiment of the present invention, respectively.

Referring to FIGS. 10A and 10B, the upper substrate 102 having the row lines 112 formed thereon and the lower substrate 104 having the column lines 114 formed thereon are bonded with the seal line 130, and the liquid crystals 132 are injected into the upper and lower substrates 102 and 104 bonded together thus.

In detail, referring to FIG. 10A, a chamber 150 is evacuated to maintain a vacuum. Then, when the liquid crystal injection hole in the liquid crystal display panel is brought into contact with a surface of the liquid crystals 154 or is dipped in the liquid crystals 154 by using a transport unit in a state the chamber 150 is sealed with a sealing member (not shown), the liquid crystals are drawn into the liquid crystal display panel by a capillary phenomenon, and, if $N_2$ is sprayed into the vacuum chamber 150 slowly at the time about 80% of the liquid crystal display panel is filled with the liquid crystals, to cause a pressure difference between an inside of the liquid crystal display panel 100 and an inside of the vacuum chamber 150, the liquid crystals fill an empty space in the liquid crystal display panel 100.

Thus, by forming the column spacers 120a partially in the vicinity of the liquid crystal injection hole, the injection of the liquid crystals 132 becomes easy in the step of liquid crystal injection. As shown in FIG. 9A, passing through spaces formed between the column spacers 102a partially thus, the liquid crystals can be injected, easily.

Figure 11A:
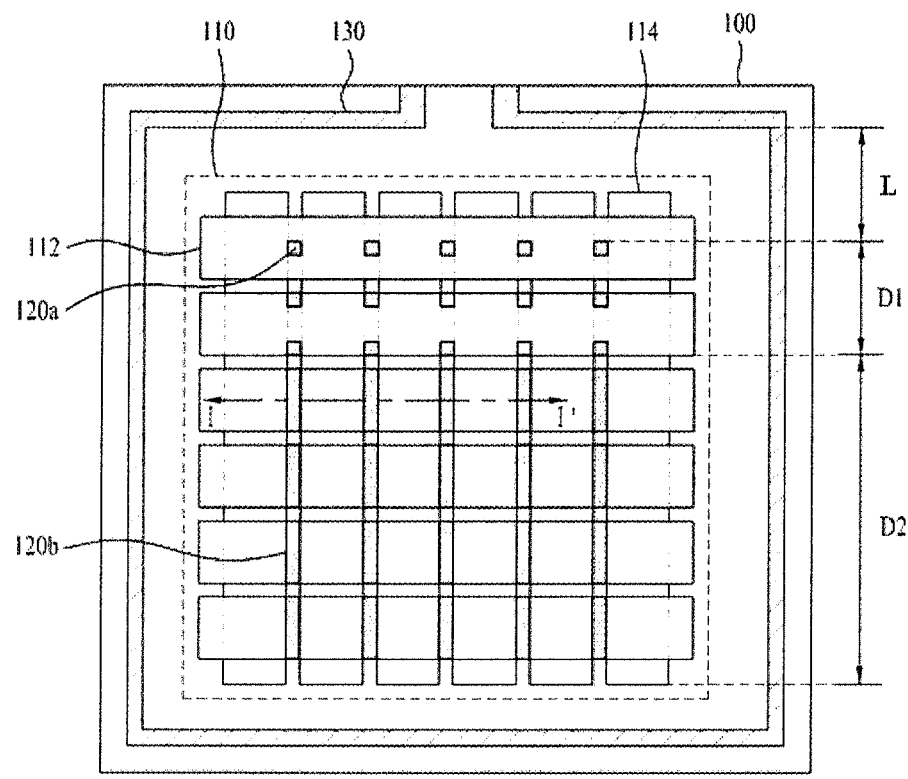
Figure 11B:
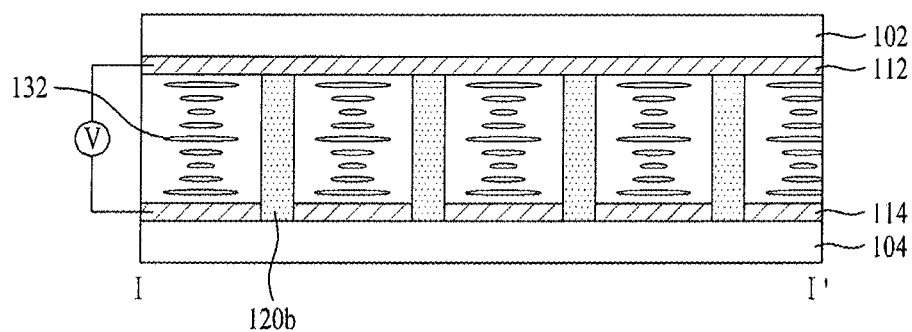

Referring to FIGS. 11A and 11B, a liquid crystal display panel 100 having the liquid crystals 132 injected between the upper substrate 102 and the lower substrate 104 is formed.

In the meantime, though the column spacer of the present invention applied to a passive liquid crystal display panel is described, the column spacer of the present invention can be applied to an active liquid crystal display panel, too.

As has been described, the liquid crystal display panel, and the method for fabricating the same of the present invention have the following advantages.

The formation of the column spacers on both sides or either side of each of the pixel regions in the dam shapes permits to prevent a Mura from taking place even if a physical impact or vibration is applied to the pixel region owing to no change of the phase of the liquid crystals.

The partial formation of the column spacers in the vicinity of a liquid crystal injection hole permits easy injection of the liquid crystals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display panel comprising:
    an upper substrate having a plurality of row lines formed thereon;
    a lower substrate having a plurality of column lines formed thereon perpendicular to the plurality of row lines, said plurality of row lines and said plurality of column lines are each formed of a transparent conductive layer; and a plurality of pixel regions formed at each crossed region of the plurality of column lines and the plurality of row lines; and column spacers each formed between the upper substrate and the lower substrate for maintaining a cell gap between the upper substrate and the lower substrate, wherein the column spacers formed at a first region of a display region adjacent to a liquid crystal injection have dot shapes and the column spacers formed at a second region which is a rest of the display region excluding the first region have dam shapes, and wherein the column spacers in the dam shape, and the column spacers in the dot shape having a different length from the column spacers in the dam shape are formed between the column lines or the row lines.

2. The liquid crystal display panel as claimed in claim 1, wherein, the column spacers in the dam shape have the same length as a length of the plurality of pixel regions.

3. The liquid crystal display panel as claimed in claim 1, wherein, the column spacers in the dot shape have a length shorter than a length of the plurality of pixel regions.

4. The liquid crystal display panel as claimed in claim 1, wherein a distance between adjacent column spacers is the same as a length of the plurality of pixel regions.

5. The liquid crystal display panel as claimed in claim 4, wherein a distance from the liquid crystal injection to the first region of the display region is in a range of 1 mm~7 mm.

6. The liquid crystal display panel as claimed in claim 5, wherein the distance is in a range of 3 mm~5 mm.

7. The liquid crystal display panel as claimed in claim 4, wherein a number of the column spacers in the first region are formed to be gradually more as it goes to the second region which is the rest of the display region excluding the first region.

8. The liquid crystal display panel as claimed in claim 1, wherein a distance between adjacent column spacers in the dam shape is longer than a length of one pixel region, such that the column spacers in the dam shape are formed in a zigzag.

9. The liquid crystal display panel as claimed in claim 8, wherein, the column spacers in the dam shape are formed between the plurality of column lines alternate sides of the plurality of pixel regions.

10. The liquid crystal display panel as claimed in claim 8, wherein, the column spacers in the dam shape are formed between the plurality of row lines to alternate sides of the plurality of pixel regions.

11. The liquid crystal display panel as claimed in claim 1, wherein a distance between adjacent column spacers in the dam shape is shorter than a length of one pixel region.

12. The liquid crystal display panel as claimed in claim 1, wherein a seal line for bonding the upper substrate and the lower substrate defines the display region.

13. The liquid crystal display panel as clamed in claim 1, wherein the plurality of column spacers in the dam shape are arranged in parallel to a rubbing direction of an alignment layer.

* * * * *